Figure 1:
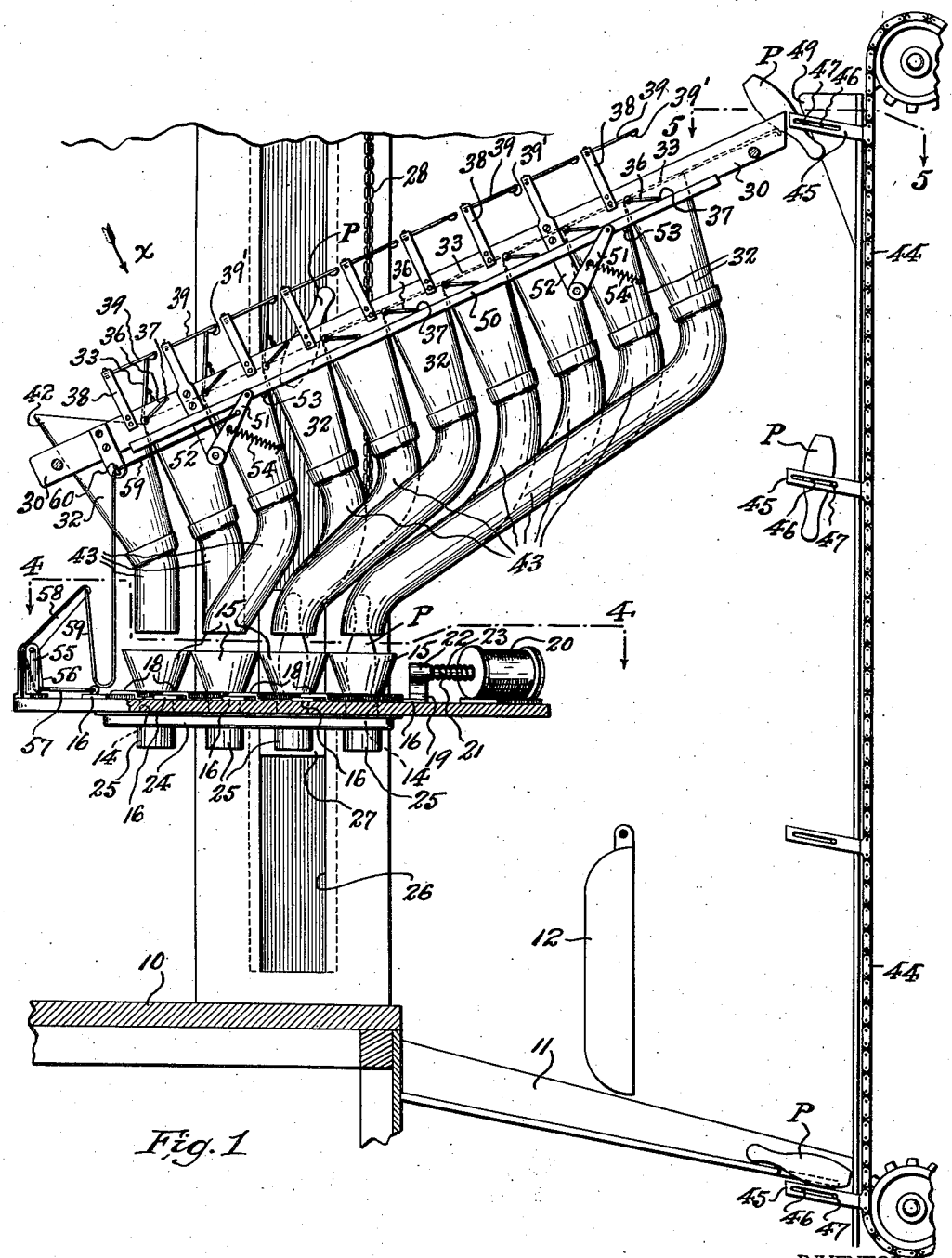

Feb. 8, 1944.  J. PARRA ET AL  2,341,475
AUTOMATIC BOWLING PIN SETTING APPARATUS
Filed July 21, 1942  4 Sheets-Sheet 1

INVENTORS:
Joseph Parra & William White,
BY George D. Richards
Attorney

Feb. 8, 1944.　　　J. PARRA ET AL　　　2,341,475
AUTOMATIC BOWLING PIN SETTING APPARATUS
Filed July 21, 1942　　　4 Sheets-Sheet 2
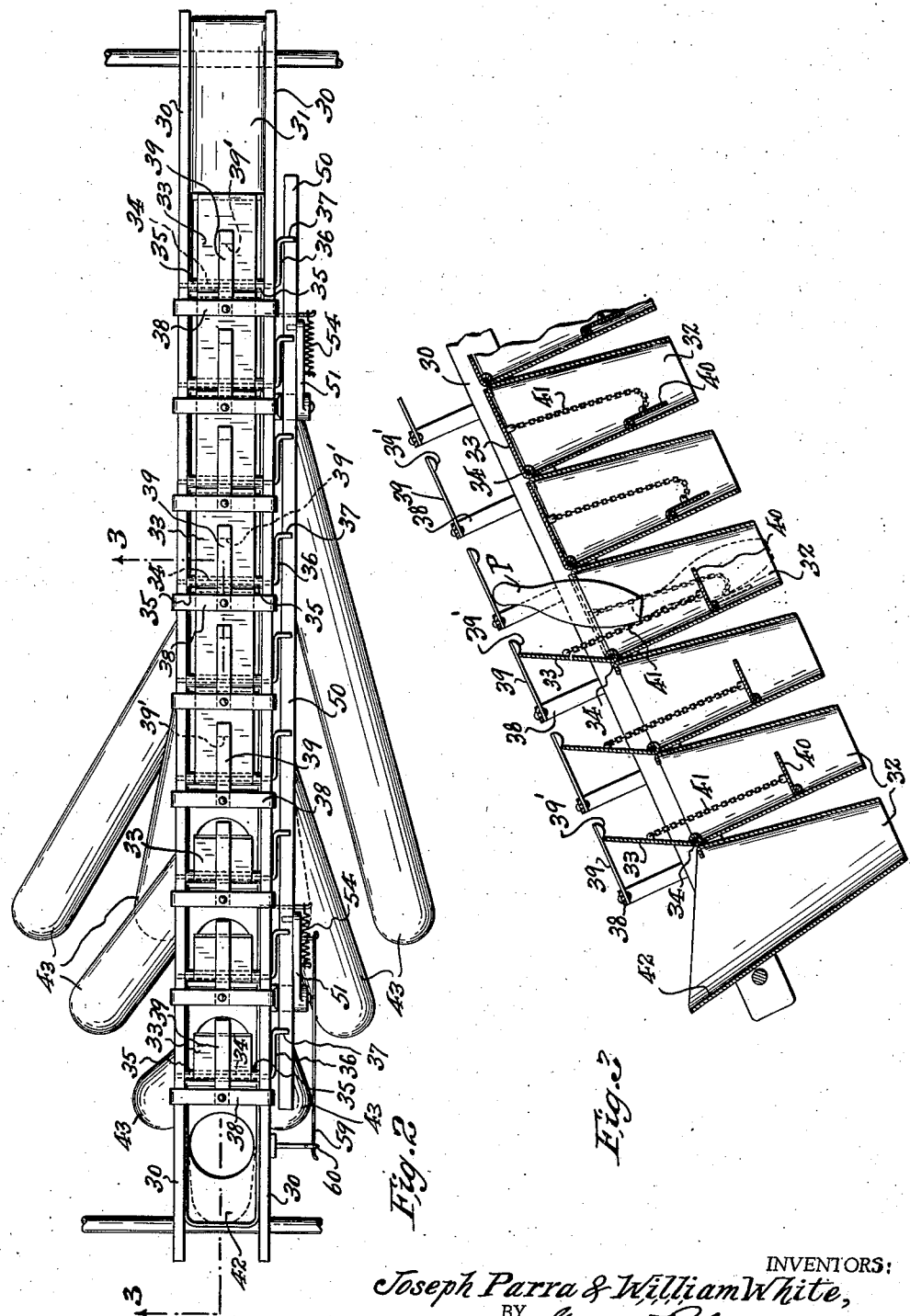
INVENTORS:
Joseph Parra & William White,
BY George D. Richards,
Attorney

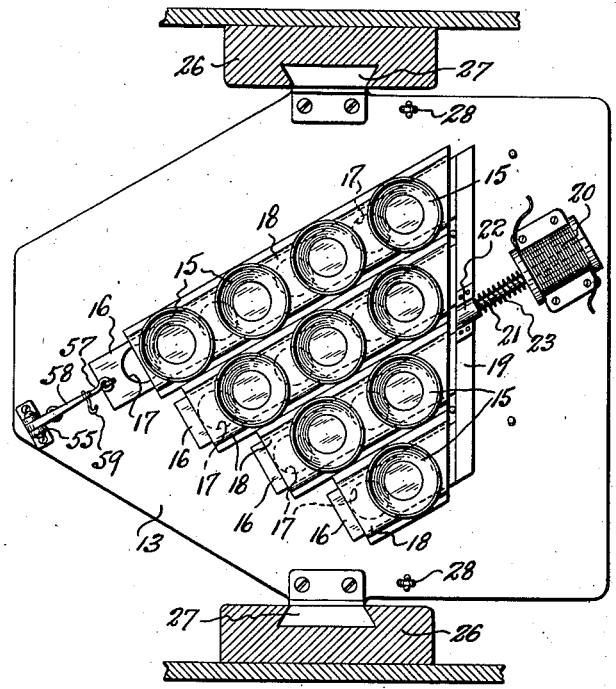

Feb. 8, 1944. J. PARRA ET AL 2,341,475
AUTOMATIC BOWLING PIN SETTING APPARATUS
Filed July 21, 1942 4 Sheets-Sheet 4

INVENTORS:
Joseph Parra & William White,
BY George D. Richards,
Attorney

Patented Feb. 8, 1944

2,341,475

UNITED STATES PATENT OFFICE 2,341,475

AUTOMATIC BOWLING PIN SETTING APPARATUS

Joseph Parra and William White, Newark, N. J.

Application July 21, 1942, Serial No. 451,704

8 Claims. (Cl. 273—43)

This invention relates to improvements in automatic pin setting apparatus for bowling alleys.

This invention has for an object to provide, in combination with a vertically movable pin spotter carriage means, a novel construction of cooperating means for automatically delivering pins to and distributively loading the same into said carriage means, preparatory to operation of the latter for depositing the pins upon the bowling alley in accurately spotted upstanding positions thereon, and properly grouped and spaced ready for play.

The invention has for another object to provide a novel pin distributing and loading means whereby pins delivered thereto are automatically distributed to and successively loaded into the several pin holder members of a pin setter carriage; said distributing and loading means comprising an inclined chute or way including a succession of dependent pin distributer drop wells which respectively terminate in means for discharging the pins into the respective pin holder members of the pin setter carriage, each distributer drop well, except the last or lowermost of the series thereof, having movable deflector plate means for shunting a pin thereinto, together with means, actuated by a pin passing therethrough, for moving its deflector plate means into the plane of the chute or way so as to bridge and close said drop well, whereby a succeeding pin descending the chute or way will pass over the closed drop well, and into the next succeeding drop well, and so on until a full set of pins has been loaded into the pin setter carriage.

The invention has for another object to provide means for automatically restoring the distributer deflector plate means to normal initial upstanding open positions when the pin setter carriage is lowered and operated to set the pins carried thereby upon the bowling alley, thereby resetting the distributer means for repetition of its pin distributing and loading operations.

Other objects of this invention, not at this time more particularly enumerated, will be understood from the following detailed description of the same.

An illustrative embodiment of this invention is shown in the accompanying drawings, in which:

Fig. 1 is a side elevation of the pin distributer and loading means and the pin setter carriage as initially related and operated to load pins into said carriage, parts of said carriage being shown in section; Fig. 2 is a plan view of the pin distributer and loading means, viewed in the direction of the arrow X in Fig. 1, but drawn on an enlarged scale; Fig. 3 is a fragmentary longitudinal vertical section, taken on line 3—3 in Fig. 2; Fig. 4 is a horizontal section showing the pin setter carriage in plan, the section being taken on line 4—4 in Fig. 1; and Fig. 5 is a fragmentary horizontal section, taken on line 5—5 in Fig. 1, but drawn on an enlarged scale.

Figure 6:
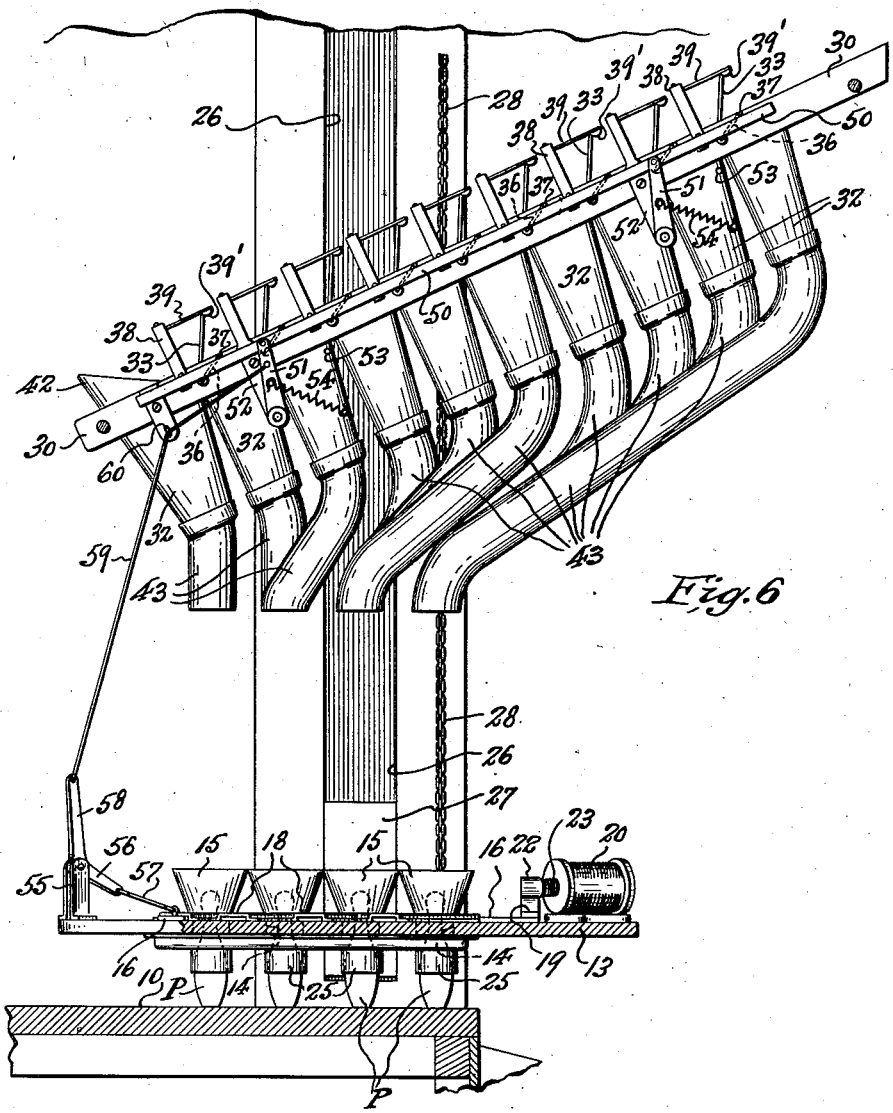

Fig. 6 is a view similar in part to that of Fig. 1, but showing the pin setter carriage lowered to pin setting position, and the means for restoring the distributer deflector plate means from drop well closing to normal initial upstanding drop well opening positions.

Similar characters of reference are employed in the hereinabove described views, to indicate corresponding parts.

In the drawings, the reference character 10 indicates the pin stand section of a bowling alley surface, and 11 the downwardly and rearwardly sloping pit at which said alley surface terminates. The reference character 12 indicates the ball and pin back-stop buffer cushion which is usually suspended within the alley pit.

The pin spotter carriage, in an illustrative form thereof as shown, comprises a platform 13 having pin drop openings 14 therethrough, the grouping and spaced relation of which corresponds to the normal grouped positions of pins P when deposited and spotted on the pin stand section 10 of a bowling alley ready for play. Supported by said platform 13, in axial alignment with the pin drop openings 14 thereof, are pin holder members, each comprising an upstanding receiving pocket element 15, which is preferably of inverted conical shape. Means are provided for opening and closing the bottoms of said receiving pocket elements 15 at proper times in accordance with operative movements of the spotter carriage. Such means is provided by slidable shutter plates 16 intermediate the bottom of said receiving pocket elements and the platform 13, said shutter plates having openings 17, adapted by movements thereof to be slid into and out of registration with the pin drop openings 14. Preferably these shutter plates 16 are aligned with rows of said pin drop openings 14 and associated receiving pocket elements 15 which are directed toward the rear end of the spotter carriage, and said shutter plates are slidably movable over the top surface of the platform 13, being guided by slideway guides 18 affixed to the latter. The rearward ends of said shutter plates are coupled together by a cross-bar 19 common thereto, so that all move together when actuated; properly timed operative movements being imparted thereto by suitable actuating means. Preferably such actuating means comprises a solenoid 20 mounted on the rear end portion of said platform 13, the armature 21 of which is affixed by a suitable supporting connection 22 to said cross-bar 19. Said solenoid 20, when energized, retracts the armature 21, such movement of the latter operating to move said shutter plates 16 so as to register their openings 17 with and between the bottoms of the receiving pocket elements 15 and the platform pin drop openings 14 aligned therewith, so that pins P carried by the former may drop downwardly therefrom and through the latter for deposit in upstanding spotted position on the alley pin stand section 10, when the spotter carriage is lowered to pin spotting position relative to said alley pin stand section. Suitably arranged spring means is provided for returning said shutter plates to closed position relative to said receiving pocket elements and their associated platform pin drop openings 14, when the solenoid 20 is de-energized. An illustrative form and arrangement of said spring means comprises a compression spring 23 mounted around the solenoid armature 21 between the cross-bar connection thereto and the opposed end of the solenoid 20.

Mounted on the underside of the pin setter carriage platform 13, in cooperative relation to the pin drop openings 14 thereof, are picker devices for handling and resetting standing pins which remain on the alley pin stand section 10 after a first ball is bowled, whereby to permit removal of dead wood preparatory to bowling of a second ball. These picker devices may be enclosed in a housing 24 affixed to the underside of the carriage platform, in connection with which are provided tubular pin discharge throats 25, through which the pins P pass for deposit upon the alley pin stand section 10. These picker devices are not shown, but preferably comprise a construction and arrangement thereof such as fully described and illustrated in our copending application for United States Letters Patent Serial No. 447,224, filed June 16, 1942.

The pin spotter carriage is mounted in any convenient manner for vertical up and down movements, as, for example, in guides 26 in which ride slide shoes 27, with which the sides of the platform 13 are equipped. Motion may be imparted to the spotter carriage by suitably actuated lift chains, cables or the like 28. Initially said spotter carriage is positioned in uplifted position (see Fig. 1), in which position the shutter plates 16 are disposed in receiving pocket element closing position, so that pins P deposited in said pocket elements are held against downward movement through the platform pin drop openings 14 and discharge throats 25.

The means for delivering pins P to and distributively loading the same into the receiving pocket elements 15 of the spotter carriage, in an illustrative form thereof according to this invention, comprises a downwardly and forwardly inclined chute frame fixed above the upper limit of the spotter carriage movement. Said chute frame includes a pair of laterally spaced side wall members 30, which bound a chute or way down which pins P delivered thereinto at its upper end may slide, the width of said chute or way being in excess of the width of the pins P, so that the latter may be guided for lengthwise movement therethrough. At the upper end portion of said chute or way, the same is provided with a fixed floor or bottom section 31. Beyond said floor or bottom section 31 are a series of successively disposed pin drop wells 32 corresponding in number to the number of pins P, viz. ten, which make up a full pin set to be stood upon the alley pin stand section 10. The open top ends or mouths of said drop wells 32 lie in a plane substantially flush with plane of said fixed floor or bottom section 31 of the chute or way. Cooperating with the mouths of each drop well 32, except the last and lowermost thereof, are pivoted deflector-bridge plate members 33, each being affixed to a pivoting shaft 34 which is suitably journaled, preferably in bearing portions 35 with which the upper end portion of the forward wall of the associated drop well is provided. At least one end of each pivoting shaft 34 projects exteriorly of a chute side wall member 30, and terminates in a crank-arm 36, the latter in turn terminating in an angular lift portion 37. Normally, said deflector-bridge plate members 33 are up-swung to standing position across the chute or way, so as to uncover and expose the mouth of an associated drop well 32, and in upward projection from the front wall of the latter so as to deflect a pin P, sliding down the chute or way toward the same, into said drop well for passage therethrough.

Means are provided for releasably retaining said deflector-bridge plate members 33 in the normal up-swung positions described. As illustratively shown, means for such purpose comprises supporting brackets 38 suitably affixed to the chute frame to project above and over the chute or way thereof, and affixed to and supported by said brackets 38 are yieldable detent members 39 provided at their free ends with nosings 39' behind which the free ends of the up-swung deflector-bridge plate members 33 are engaged, whereby to releasably hold the latter in normal up-standing positions.

Pin actuated means are provided for releasing and swinging down the deflector-bridge plate members 33 after a pin P enters and passes downwardly through an associated drop well 32. This means comprises a trip plate 40 pivotally connected with the forward wall of each associated drop well 32, at a suitable pin intermediate the upper and lower end of the latter. The trip plate 40 of each said drop well is connected with its associated deflector-bridge plate member by a pull connection 41, preferably comprising a chain, pull cord, cable or like flexible element. Each pull connection 41 is of such length that, when the served deflector-bridge plate member 33 is up-swung to normal open position, the associated trip plate 40 will be up-swung to a normal position transverse to the pin passage of the drop well 32 within which it is mounted, and thus disposed to project into the path of pin movement therethrough. When a pin P is deflected by an up-swung deflector-bridge plate member 33, so as to be shunted into an associated drop well 32 for downward passage therethrough, said pin P, as it passes down through said drop well, will strike and swing down its trip plate, thereby exerting a downward pull upon the pull connection 41 thereof which is transmitted to the associated deflector-bridge plate member 33, whereby the latter is released from the yieldable detent member 39 and its nosing 39', and thereupon swung down to closing and bridging relation to the mouth of the drop well served thereby, thus permitting a succeeding pin P to pass thereover and to the next adjacent drop well.

The last and lowermost drop well 32 requires no pivoted deflector-bridge plate member since only the last pin P of a set is passed therethrough, and consequently its mouth may remain permanently open. The forward wall of said last and lowermost drop well 32 is provided however with an extension 42 to project across the path of pin movement through the chute or way, so as to arrest a pin and turn it downward into and for movement through said last drop well.

Connected with the bottom ends of the drop wells 32 are pin conduits 43, the respective discharge ends of which are disposed in alignment with and above the respective pin receiving pocket elements 15 of the spotter carriage; the preferred arrangement being such that pins P are successively delivered to said receiving pocket elements in reverse order, that is the conduit of the first and uppermost drop well 32 delivers a pin P to the ten pin position, the next to the nine pin position, the next to the eight pin position, and so on until the pin P passing through the conduit of the last and lowermost drop well 32 is delivered to the one or head pin position; all in conformance with the familiar standard group arrangement of pins when set upon a bowling alley.

Suitable means is provided for conveying pins P from the bowling alley pit 11 upwardly to and for delivery into the upper end of the chute or way of the described pin distributing means. A preferred arrangement and form of such pin conveyer means comprises a continuously operated endless conveyer chain 44, the rising course of which traverses the rear end of the pit 11, and extends upwardly therefrom to and somewhat beyond the upper receiving end of the pin distributer chute or way. Affixed to said conveyer chain 44, at suitably spaced intervals along the length thereof, are pin carrier forks 45, the arms of which are laterally spaced at a distance somewhat less than the major width of a pin P, so that when a pin P is engaged thereby it will be suspended bottom up by and between said fork arms. Each of the fork arms is provided with a longitudinal slot 46 of suitable length, the outer end of which terminates adjacent to the free end of the fork arm in which it is formed. Extending across the pin receiving space intermediate said fork arms is a movable transverse pin discharge bar 47, the respective ends of which extend through the slots of the respective fork arms so as to project laterally and exteriorly therefrom. The pin discharge bar 47 of each carrier fork 45 is yieldably retracted by pull-spring means 48 to an inwardly stopped position as determined by the rearward ends of the fork arm slots 46. Supported in a fixed position adjacent to the pin receiving end of the distributer chute or way, and respectively in the path of travel of the exteriorly projecting end portions of the carrier fork pin discharge bars 47, are suitably shaped actuating cam pieces 49 adapted to be engaged and traversed by said end portions of the pin discharge bars 47, whereby to move the latter outwardly in the fork arm slots 46 so as to push a pin P off of the carrier fork by which it is suspended, and thus tumble the same bottom end first into the receiving end of the distributer chute or way (see Fig. 1 and Fig. 5).

Initially the spotter carriage is raised to uplifted position with its pin receiving pocket elements 15 respectively aligned below and adjacent to the discharge ends of the pin conduits 43 (see Fig. 1). When the spotter carriage is disposed in this pin receiving position, all of the deflector-bridge plate members 33 initially occupy their up-swung drop well opening positions ready to admit pins into said drop wells. Under these conditions, pins P which are thrown into the pit 11, move down to the rear of the latter, from which point they are successively picked up by the pin carrier forks 45 of the elevator conveyer 44, so as to be carried upwardly from the pit to the receiving end of the distributer chute or way. As a pin carrier fork 45 with a pin P suspended thereon approaches the receiving end of the distributer chute or way, the ends of the pin discharge bar 47 of such pin carrier fork will ride onto the oblique upwardly and outwardly inclined margins of the stationary cam pieces 49, and, as they transverse the latter, said pin discharge bar will be thrust outwardly, thereby pushing outward the suspended pin P, until finally said pin P is tumbled off of the carrier fork, bottom end first, onto the floor or bottom section 31 of the distributer chute or way (see Fig. 1). When thus deposited in the distributer chute or way, the pin P slides down through the same until it encounters the up-swung deflector-bridge plate member 33 of the first or uppermost drop well 32, being deflected thereby so as to drop bottom first thereinto. As the pin P passes downwardly through said first drop well, it encounters and swings down the trip plate 40 thereof, thus in turn swinging down the deflector-bridge plate 33 to dispose the latter in closing and bridging relation to the mouth of said first drop well 32. In the meantime, the pin elevator conveyer means having carried a succeeding pin P to and discharged the same into the receiving end of the distributer chute or way, such succeeding pin will slide down the latter and over the closed deflector-bridge plate 33 of the first drop well, until it encounters the up-swung deflector-bridge plate of the second drop well, whereby it is deflected downwardly through the latter, and so as to close its deflector-bridge plate. In this manner, each succeeding pin P delivered into the chute or way will move over drop wells through which previously delivered pins have passed to the next open drop well, and until finally a tenth or last pin is delivered to and passed through the last and lowermost drop well 32 which is constantly open. Since each drop well is connected by its pin conduit 43 with a given and different pin receiving pocket element of the spotter carriage, the ten pins delivered through the chute or way and communicating drop wells will be properly distributed and loaded into the spotter carriage in the conventional grouped arrangement of a pin set-up for a bowling alley.

After the spotter carriage is loaded with a full complement of pins P, the same is actuated by suitably controlled and timed means (not shown) for lowering the same toward and adjacent to the alley pin stand section 10, so that the pins P carried thereby may be released and dropped therefrom upon the spots of the alley pin stand section 10, and so as to stand upon said section ready for play (see Fig. 6). An electrical circuit (not shown) to serve the solenoid 20 is provided, the same including control switch means which is preferably arranged to be automatically closed by arrival of the spotter carriage at its lowered pin setting position, thus energizing the solenoid 20 at such time. The solenoid 20 being energized, functions to retract its armature 21, the movement of which is transmitted to the shutter plates 16, whereby to slide the latter to positions adapted to open the bottoms of the pin receiving pocket elements 15 so that the pins P may drop through the platform openings 14 and discharge throats 25 to standing position on the alley pin stand section 10.

Means is provided for resetting the deflector-bridge plates 33 of the pin distributer means to open positions in which they are releasably retained by the detent members 39. This means comprises a reset bar 50 which extends longitudinally beneath the lift portions 37 of the crank arms 36 which rotate the pivoting shafts 34 of said deflector-bridge plates. Said reset bar 50 is mounted for bodily up and down movement, and to this end longitudinally spaced lever arms 51 are provided, to the free ends of which said reset bar is pivotally connected. Said lever arms 51 are pivotally mounted on bracket supports 52 which are affixed to a side wall 30 of the distributer chute frame. Said reset bar is normally and yieldably retained in lowered position, as determined by stops 53, by suitably anchored pull spring elements 54 which are attached to said lever arms 51. When said reset bar is caused to swing upward from its normal lowered position, it engages the lift portions 37 of down-swung crank arms 36, and by its upward movement up-swings the latter, thereby rotating the shafts 34 to in turn up-swing the deflector-bridge plates 33 into detained engagement by the cooperating detent members 39 (see Fig. 6).

Means for effecting suitably timed actuation of said reset bar 50 is provided. Preferably such actuating means is timed to reset the deflector-bridge plates 33 while the spotter carriage is lowered to pin setting position, and thus prior to rise of the latter to raised position for reloading. Such actuating means is subject to more or less variation in form and kind. Illustrative of a simple, effective and perhaps preferable form thereof, as shown by the drawings, the same comprises a bell-crank lever pivoted in bearing standard 55 affixed on the platform 13 of the spotter carriage, in alignment with a shutter plate 16 of the latter. The lower arm 56 of said bell-crank lever is connected by a link 57 to said shutter plate 16, and from the upper arm 58 of said bell-crank lever extends a pull-cable 59 which is secured to a lever arm 51 of the reset bar 50. Preferably said pull-cable 59 extends through a suitably positioned guide eye 60 which is suitably supported in connection with the distributer chute frame. When the spotter carriage is raised for loading, the pull-cable 59 will become slack, and the reset bar will be retained in normal lowered position by the springs 54, while the bell-crank lever 56—58 will have been moved to its normal initial position by the closed shutter plate 16 with which it is connected (see Fig. 1). When the loaded spotter carriage descends and reaches its pin setting position, the slack in the pull-cable 59 will be taken up, while the reset bar 50 and bell-crank lever remain in their normal initial positions. As a consequence of this the pull-cable 59 will be stretched ready to transmit motion imparted thereto by operative movement of said bell-crank lever. Under these conditions, when the solenoid 20 is energized to retract the shutter plates 16 to open position, such movement of the latter will be transmitted through the link 57 to the bell-crank lever, whereby the latter will be turned so as to swing outward its arm 58, thereby exerting a pull upon the pull-cable 59 which is transmitted to a reset bar lever arm 51 with up-swinging effect thereupon, to impart up-lifting movement to said reset bar (see Fig. 6), so that the rise of the latter will operate to reset the deflector-bridge plates 33 to open positions as above explained. When the shutter plates 16 are closed said bell-crank lever will be returned to normal initial position, the pull-cable 59 will be relaxed, and the reset bar 50 will thereupon be returned to lowered position by its springs 54, leaving the deflector-bridge plates 33 held in their open positions by the detent members 39. When the spotter carriage thereafter rises to its position for reloading with pins, the pull-cable will again slacken, and the distributer means is conditioned for repetition of the above described pin distributing and loading operations.

We are aware that many and various changes could be made in the construction and arrangement of the mechanisms and parts thereof which comprise the pin setting apparatus above described without departing from the spirit of our invention and within the scope thereof as defined by the following claims. It is therefore intended that all matter contained in the above description or shown in the accompanying drawings shall be interpreted as illustrative and not in a limiting sense.

We claim:

1. In bowling pin setting apparatus, the combination with a vertically movable spotter carriage adapted to receive, group and spot a complement of pins upon the pin stand section of a bowling alley, of means supplied from the alley pit to distributively deliver pins into said spotter carriage preparatory to a spotting operation thereof, comprising a chute means downwardly inclined from its receiving end and positioned to cooperate with the spotter carriage when the latter is raised to pin receiving position, said chute means including a succession of drop wells along the length thereof terminating in means to distribute to and group the pins in the spotter carriage, each drop well, except the last and lowermost thereof, having a movable deflector means normally upswung across the chute way for shunting a pin into the drop well immediately in advance thereof, means for releasably holding each deflector means in such normal upswung open position, means in each said drop well, actuatable by a pin dropped therethrough, to swing down its associated deflector means over the mouth thereof to close the same, whereby a succeeding pin passes over the thus closed drop well to the next succeeding drop well, and means actuated by pin depositing operation of the spotter carriage for resetting the closed deflector means to normal upswung open positions preparatory to reloading the spotter carriage after the pin spotting operation thereof.

2. In a bowling pin setting apparatus, the combination with a vertically movable spotter carriage adapted to receive, group and spot a complement of pins upon the pin stand section of a bowling alley, of means supplied from the alley pit to distributively deliver pins into said spotter carriage preparatory to a spotting operation thereof, comprising a chute means downwardly inclined from its receiving end and positioned to cooperate with the spotter carriage when the latter is raised to pin receiving position, said chute means including a succession of drop wells along the length thereof terminating in means to distribute to and group the pins in the spotter carriage, each drop well, except the last and lowermost thereof, having a deflector means, each deflector means having a shaft for pivoting the same, means for releasably holding each deflector means in normal up-turned position across the chute way for shunting a pin into the drop well served thereby, means in each drop well, actuatable by a pin dropped therethrough, to down-turn its deflector means over the mouth thereof to close the same, whereby a succeeding pin passes over the thus closed drop well to the next succeeding drop well, each deflector means shaft having a crank-arm for rotating the same, and means cooperative with all said crank-arms operative to rotate their shafts and thereby move the deflector means from down-turned positions back to normal up-turned positions preparatory to reloading the spotter carriage after a pin spotting operation thereof.

3. In a bowling pin setting apparatus, the combination with a vertically movable spotter carriage adapted to receive, group and spot a complement of pins upon the pin stand section of a bowling alley, of means supplied from the alley pit to distributively deliver pins into said spotter carriage preparatory to a spotting operation thereof, comprising a chute means downwardly inclined from its receiving end and positioned to cooperate with the spotter carriage when the latter is raised to pin receiving position, said chute means including a succession of drop wells along the length thereof terminating in means to distribute to and group the pins in the spotter carriage, each drop well, except the last and lowermost thereof, having a deflector means, each deflector means having a shaft for pivoting the same, means for releasably holding each deflector means in normal up-turned position across the chute way for shunting a pin into the drop well served thereby, means in each drop well, actuatable by a pin dropped therethrough, to down-turn its deflector means over the mouth thereof to close the same, whereby a succeeding pin passes over the thus closed drop well to the next succeeding drop well, each deflector means shaft having a crank-arm for rotating the same, and means cooperative with all said crank-arms operative to rotate their shafts and thereby move the deflector means from down-turned positions back to normal up-turned positions preparatory to reloading the spotter carriage after a pin spotting operation thereof, said latter means comprising a substantially vertically movable reset bar, and means for effecting timed actuation of said reset bar.

4. In bowling pin setting apparatus, means to distributively deliver a set of pins to a spotter means, comprising an inclined chute means having a succession of drop wells along the length thereof, each drop well, except the last and lowermost thereof, having a deflector means, each deflector means having a shaft for pivoting the same, means for releasably holding each deflector means in normal up-turned position for shunting a pin, descending said chute means, into the drop well served thereby, means for each drop well, actuatable by a pin dropped therethrough, to down-turn its deflector means over the mouth thereof, whereby a succeeding pin passes over the thus closed drop well to the next succeeding drop well, each deflector means shaft having a crank-arm for rotating the same, and means cooperative with all said crank-arms operative to rotate their shafts and thereby move the deflector means from down-turned positions back to normal up-turned positions preparatory to a subsequent pin set delivering and distributing operation.

5. In bowling pin setting apparatus, means to distributively deliver a set of pins to a spotter means, comprising an inclined chute means having a succession of drop wells along the length thereof, each drop well, except the last and lowermost thereof, having a deflector means, each deflector means having a shaft for pivoting the same, means for releasably holding each deflector means in normal up-turned position for shunting a pin, descending said chute means, into the drop well served thereby, means for each drop well, actuatable by a pin dropped therethrough, to down-turn its deflector means over the mouth thereof, whereby a succeeding pin passes over the thus closed drop well to the next succeeding drop well, each deflector means shaft having a crank-arm for rotating the same, and means cooperative with all said crank-arms operative to rotate their shafts and thereby move the deflector means from down-turned positions back to normal up-turned positions preparatory to a subsequent pin set delivering and distributing operation, said latter means comprising a substantially vertically movable reset bar, and means for effecting timed actuation of said reset bar.

6. In bowling pin setting apparatus, a spotter carriage arranged to be raised and lowered relative to the pin stand section of a bowling alley, said spotter carriage having conventionally grouped pin receiving pockets and movable shutter means to open the latter for the issue of pins therefrom to standing position on said pin stand section, means to distributively deliver pins into said receiving pockets, said latter means comprising an inclined chute means positioned to cooperate with the spotter carriage when the latter is raised to pin receiving position, said chute means including a succession of drop wells along the length thereof terminating in means to distribute pins to said spotter carriage receiving pockets, each drop well, except the last and lowermost thereof, having a normally open movable deflector means for shunting a pin thereinto, means for releasably holding said deflector means in normal open positions, means for each drop well, actuatable by a pin dropped therethrough, to close its deflector means over the mouth thereof, whereby a succeeding pin passes over the thus closed drop well to the next succeeding drop well, means for resetting the closed deflector means to normal open positions preparatory to reloading the spotter carriage after a spotting operation thereof, and means controlled by opening movement of the receiving pocket shutter means of said spotter carriage for actuating said resetting means.

7. In bowling pin setting apparatus, a spotter carriage arranged to be raised and lowered relative to the pin stand section of a bowling alley, said spotter carriage having conventionally grouped pin receiving pockets and movable shutter means to open the latter for the issue of pins therefrom to standing position on said pin stand section, means to distributively deliver pins into said receiving pockets, said latter means comprising an inclined chute means positioned to cooperate with the spotter carriage when the latter is raised to pin receiving position, said chute means including a succession of drop wells along the length thereof terminating in means to distribute pins to said spotter carriage receiving pockets, each drop well, except the last and lowermost thereof, having deflector means, each deflector means having a shaft for pivoting the same, means for releasably holding each deflector means in normal up-turned position for shunting a pin into the drop well served thereby, means in each drop well, actuatable by a pin dropped therethrough to down-turn its deflector means over the mouth thereof, whereby a succeeding pin passes over the thus closed drop well to the next succeeding drop well, each deflector means shaft having a crank-arm for rotating the same, a substantially vertically movable reset bar cooperative with all said crank-arms operative, when raised, to rotate their shafts and thereby move the deflector means from down-turned to normal up-turned positions preparatory to reloading the spotter carriage after a spotting operation thereof, and means controlled by opening movement of the receiving pocket shutter means of said spotter carriage for actuating said reset bar.

8. In a bowling pin setting apparatus, a spotter carriage arranged to be raised and lowered relative to the pin stand section of a bowling alley, said spotter carriage having conventionally grouped pin receiving pockets and movable shutter means to open the latter for the issue of pins therefrom to standing position on said pin stand section, means to distributively deliver pins into said receiving pockets, said latter means comprising an inclined chute means positioned to cooperate with the spotter carriage when the latter is raised to pin receiving position, said chute means including a succession of drop wells along the length thereof terminating in means to distribute pins to said spotter carriage receiving pockets, each drop well, except the last and lowermost thereof, having deflector means, each deflector means having a shaft for pivoting the same, means for releasably holding each deflector means in normal up-turned position for shunting a pin into the drop well served thereby, means in each drop well, actuatable by a pin dropped therethrough, to down-turn its deflector means over the mouth thereof, whereby a succeeding pin passes over the thus closed drop well to the next succeeding drop well, each deflector means shaft having a crank-arm for rotating the same, a reset bar supported by pivoted lever arms subject to substantially vertical bodily movements, means for yieldably holding said reset bar in normal initial lowered position, said reset bar when upwardly moved being adapted to actuate all said crank-arms and their shafts whereby to move the deflector means from down-turned to normal up-turned positions preparatory to reloading the spotter carriage after a spotting operation thereof, a bell-crank lever pivotally mounted on said spotter carriage and linked to the receiving pocket shutter means of the latter so as to operatively be turned by opening movement of said shutter means, and pull-cable means interconnected between said bell-crank lever and said reset bar.

JOSEPH PARRA.
WILLIAM WHITE.